United States Patent [19]

Vanderwel

[11] 3,736,372

[45] May 29, 1973

[54] ELECTRICAL CIRCUIT

[76] Inventor: Peter W. Vanderwel, 780 North Mitzie Drive, North Muskegon, Mich. 49445

[22] Filed: Feb. 18, 1972

[21] Appl. No.: 227,386

[52] U.S. Cl. ................................178/5.4 R, 178/6.8
[51] Int. Cl. ................................H04n 9/02
[58] Field of Search..........................178/5.4, 5.2, 6.8

[56] References Cited

UNITED STATES PATENTS 3,647,942 3/1972 Siegel ..................................178/5.4

*Primary Examiner*—Richard Murray
*Attorney*—Peter P. Price, Lloyd A. Heneveld and Everett L. Huizenga

[57] ABSTRACT

An electrical circuit for providing preselected two color television signals in response to luminance signals from a black and white video signal source at a television transmitting station. The electrical circuit includes a frequency divider which receives color sub-carrier signals and provides sub-multiple frequency signals therefrom. A pair of color signal generating circuits are coupled to the frequency dividing circuit, receive the sub-multiple frequency signals therefrom and provide color signals having hue and saturation parameters which can be adjusted in a predetermined manner to provide the desired color output signals therefrom. A video level detecting circuit detects the amplitude of the luminance signals and develops a control signal representative thereof. An electrically operated switching circuit receives the color signals from each color generating circuit and the control signal from the video level detecting circuit and applies one or the other of the color signals to a mixer circuit in response to the control signal. A mixer circuit combines the color signals with the luminance signals in timed relationship to provide composite two color television signals corresponding in a predetermined manner to the original black and white video signals.

17 Claims, 1 Drawing Figure

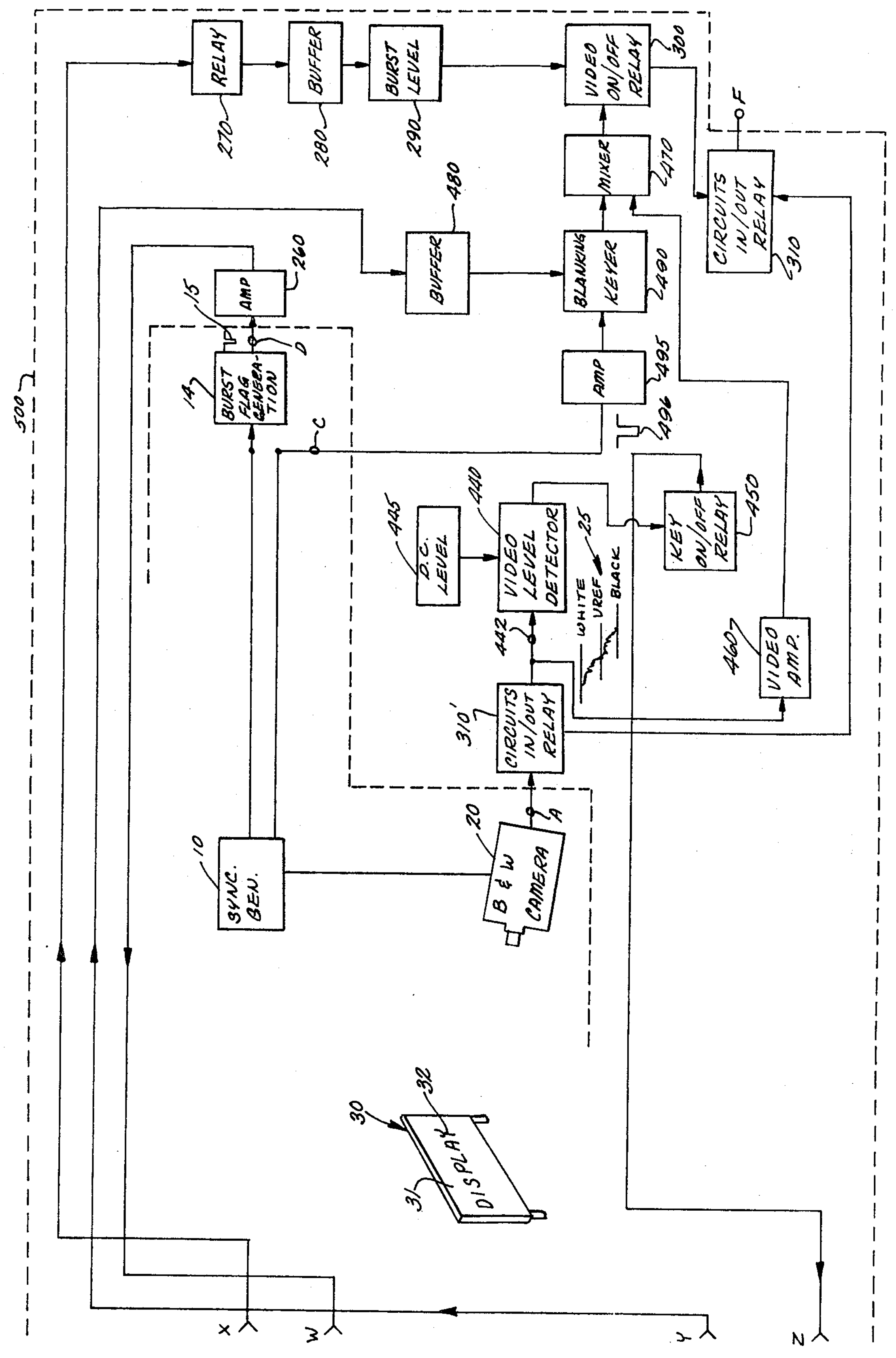
RELAY
BUFFER
BURST LEVEL
VIDEO ON/OFF RELAY
MIXER
CIRCUITS IN/OUT RELAY
BUFFER
BLANKING KEYER
AMP
BURST FLAG GENERATION
AMP
D.C. LEVEL
VIDEO LEVEL DETECTOR
WHITE
VREF
BLACK
KEY ON/OFF RELAY
VIDEO AMP.
CIRCUITS IN/OUT RELAY
SYNC. GEN.
B & W CAMERA
DISPLAY
270
280
290
300
310
470
480
490
495
496
260
15
14
D
C
445
440
25
450
442
460
310'
20
A
10
500
30
31
32
X
W
Y
Z
F

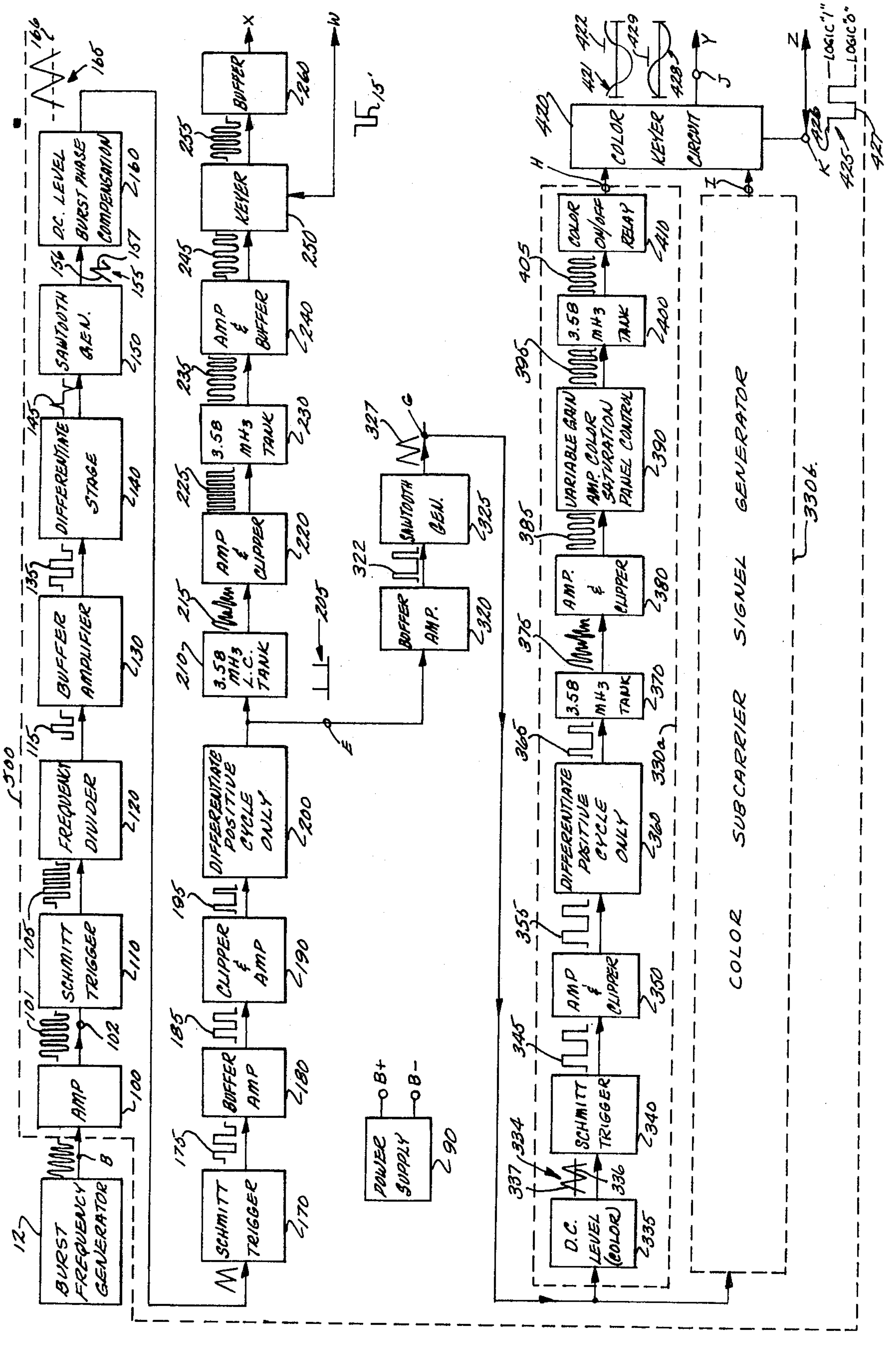
BURST FREQUENCY GENERATOR
AMP
SCHMITT TRIGGER
FREQUENCY DIVIDER
BUFFER AMPLIFIER
DIFFERENTIATE STAGE
SAWTOOTH GEN.
D.C. LEVEL BURST PHASE COMPENSATION
SCHMITT TRIGGER
BUFFER AMP
CLIPPER & AMP
DIFFERENTIATE POSITIVE CYCLE ONLY
3.58 MHz L.C. TANK
AMP & CLIPPER
3.58 MHz TANK
AMP & BUFFER
KEYER
BUFFER
BUFFER AMP.
SAWTOOTH GEN.
POWER SUPPLY
B+
B-
D.C. LEVEL (COLOR)
SCHMITT TRIGGER
AMP & CLIPPER
DIFFERENTIATE POSITIVE CYCLE ONLY
3.58 MHz TANK
AMP. & CLIPPER
VARIABLE GAIN AMP. COLOR SATURATION PANEL CONTROL
3.58 MHz TANK
COLOR ON/OFF RELAY
COLOR KEYER CIRCUIT
COLOR SUBCARRIER SIGNAL GENERATOR
LOGIC "1"
LOGIC "0"

ELECTRICAL CIRCUIT

BACKGROUND OF THE INVENTION

The present invention relates to a color-adding circuit for adding chroma information to black and white television signals.

Many television stations and especially relatively small stations, have only one or two color cameras or other color-generating equipment for providing color television signals which are transmitted to the television audiences within their viewing area. When "spot" local commercials are presented, frequently the color-generating equipment is in use for other purposes. Thus, spot commercials, which may only be a slide with an advertiser's information and identification accompanied by an audio presentation by an announcer, for example, must be transmitted in black and white. Also, the expense of presenting a full color commercial is prohibitive to many local advertisers who wish to present only relatively short commercials. Thus, frequently the "spot" local commercials are still in black and white although the majority of network and local programming may be in color.

One manner of providing color signals without the use of a color television camera is by converting black and white signals into pseudo-color signals by means of color conversion circuitry. U.S. Pat. No. 3,258,528, Oppenheimer, issued on June 28, 1966, and U.S. Pat. No. 3,551,589, Moskovitz, issued Dec. 29, 1970, are both directed toward such an apparatus. The electrical circuits described in these patents, however, attempt to fully convert black and white signals into continuous color signals. The resulting color signals, when using such a system, are unnatural in appearance due to the fact that several hues in the color spectrum will appear as the same luminance level and therefore will frequently be converter into a color signal having an erroneous hue. The circuitry described in these patents is entirely different than that of the present invention which provides an improved means for generating color representative signals corresponding to predetermined luminance signals.

SUMMARY OF THE INVENTION

The electrical circuit of the present invention produces a plurality of color signals in response to detected video levels by frequency dividing the color subcarrier signals generated at the television station, phase shifting the frequency divided signals, and frequency converting them to provide color signals having a presetable phase and therefore hue. The saturation of the color signals so generated can also be varied to provide the desired color output signals.

In its broader embodiment, the electrical circuit of the present invention provides color subcarrier signals which can be phased in a predetermined relationship with signals from the color subcarrier generator of a transmitting station. The circuitry in one embodiment provides color-burst frequency signals which can be adjusted and phased to match a desired color subcarrier source. The electrical circuit of the present invention is designed to compatibly fit within the television transmission chain of a station and receives color subcarrier signals from the stations signal generator as well as composite synchronization signals and black and white video signals together with blanking and burst flag signals while providing composite television output signals.

It is an object therefore of the present invention to provide an electrical circuit which is coupled within the signal transmission chain of a television transmitting station to convert black and white video signals into color television signals having chroma information therein corresponding in a predetermined relationship to detected luminance signals.

It is an additional object of the present invention to provide an electrical circuit for converting black and white television signals into composite color television signals by employing a frequency divider and phase shifting means.

It is still an additional object of the present invention to provide color subcarrier signals having a predetermined phase relationship to incoming color subcarrier signals.

These and other objects of the present invention will become apparent upon reading the specification together with the sole FIGURE.

BRIEF DESCRIPTION OF THE DRAWING

The sole FIGURE is an electrical circuit diagram on two sheets and in block diagram form including electrical signal wave forms at various stages within the circuit,

DETAILED DESCRIPTION OF THE PREFERRED EMBODIMENT

Referring now to the sole FIGURE, there is shown a typical television transmitting system including a synchronization signal generator 10 which provides horizontal and vertical synchronization pulses as well as blanking pulses. The sync generator 10 is a standard, commercially available item as is the burst frequency generator 12 which provides color subcarrier frequencies 3.579545 MHz. Frequently the sync generator 10 will include the burst frequency generator 12 as one unit. A burst flag generator 14 is coupled to the synchronization pulse generator 10 (and may also be included therein) and provides a burst flag pulse shown by the wave form 15 which is employed to insert eight to eleven cycles of color subcarrier frequencies to the back porch interval of every horizontal sync pulse interval of a composite color television signal. The transmitting station also includes a video signal source such as a camera 20 which may be a color television camera thereby producing color information signals but which in some installations is a black and white camera as shown in the figure that provides only luminance information. The camera 20 is coupled to the synchronization pulse generator 10 and receives therefrom horizontal and vertical sync pulses which synchronize the camera's sweep circuits.

The black and white television camera 20 is directed toward an object 30 which can be multicolored or black and white. The camera receives luminance information from the object 30 and provides at output terminal A, black and white video signals. In accordance with one aspect of the present invention these signals can be converted into two different colored signals corresponding to and in synchronization with the object scanned by the camera 20.

The color adding electrical circuit 500 employed for this purpose includes the circuitry enclosed within the dashed lines of the figure. Circuit 500 receives video signals from camera 20 at terminal A, burst frequency signals from the generator 12 at input terminal B, blanking signals from the synchronization signal generator 10 at input terminal C, and burst flag pulses 15 from the burst flag generator 14 at input terminal D. The 3.58 MHz burst frequency signals at input terminal B are amplified by an amplifier 100 of conventional design. The amplified burst signals from amplifier 100 are applied to an input terminal 102 of a voltage responsive pulse generator 110 such as a Schmitt Trigger which converts the sinusoidal 3.58 MHz signals illustrated by wave form 101 at the output of amplifier 100 into square wave signals 105. The Schmitt Trigger is of conventional design and is commercially available as an integrated circuit Type MC9809P (or its equivalent) from Motorola Semiconductor Products Inc. The square wave output pulses 105 having a frequency of 3.58 MHz are applied to a frequency divider 120 which is a divide by four binary counter. Circuit 120 converts the 3.58 MHz square wave signals 105 into pulses 115 which have a frequency of approximately 0.9 MHz. Circuit 120 is also of conventional design and commercially available as an integrated circuit type MC877P (or its equivalent) from Motorola Semiconductor Products Inc.

Signals 115 from the frequency dividing circuit 120 are applied to a buffer amplifier 130 which can also be an integrated circuit type MC889P (or its equivalent) commercially available from the Motorola Semiconductor Products Inc. The output square wave signals 135 from the buffer amplifier 130 are applied to a differentiating stage 140 which differentiates the signals 135 to produce positive and negative going signals 145 at the output of the differentiator 140.

The positive going spikes shown in wave form 145 trigger a sawtooth generator 150 which comprises a conventional circuit employing a sawtooth capacitor which is charged at a linear rate and which is periodically discharged. The resulting output sawtooth signals are shown by the wave form 155 and include a positive going slope 156 corresponding to the charging portion of the sawtooth capacitor and sharply falling portions 157 corresponding to the discharge of the capacitor which is accomplished by applying the differentiated pulses 145 to the base of an N. P. N. transistor having its collector-emitter current path in parallel with the sawtooth capacitor.

The sawtooth signals 155 from the generator 150 are applied to a direct voltage (D.C.) level setting circuit which includes an adjustable voltage divider for setting the D.C. level of the sawtooth signals at a desired predetermined level. The adjustment for the D.C. level setting circuit 160 is provided on the control panel (not shown) of the electrical circuit 500 for easy access. The resulting output signals 165 from the D.C. level setting circuit 160 are sawtooth in shape and have a D.C. level indicated by the level 166 in wave form 165. This level is adjustable between the ranges of the B− and B+ supply voltages provided by the power supply 90 for the circuits. It is understood that the various circuits shown in block form in the figure are coupled to the power supply 90 to receive operating power therefrom.

The D.C. level adjusted sawtooth signals 165 are applied to a second Schmitt Trigger 170 which is a portion of the same integrated circuit forming the Schmitt Trigger 110. Circuit 170 will trigger at a predetermined time during the positive slope of the sawtooth signal

165 depending upon the D.C. level 166 adjusted by the level setting control 160. By varying the level control 166 therefor, the phase of the leading edge of the output square waves 175 from the Schmitt Trigger 170 can be adjusted to vary over a range of at least 100°. By adjusting the D.C. level 166 by means of circuit 160, therefor, the output burst frequency signals from the color adding circuit 500 can be adjusted to correspond in phase to the incoming burst signals from the generator 12 or to any other desired phase as described in detail below.

The output signals 175 from the Schmitt Trigger 170 are square wave signals having a frequency of .9 MHz and having a leading edge phase preset as desired by the operator. These signals are applied to a buffer amplifier 180 which can be a portion of the same integrated circuit employed for the buffer amplifier 130 and identified above. The square wave signals 185 are applied to a clipper and amplifier stage 190. Circuit 200 differentiates the positive pulses 195 which have a frequency of 0.9 MHz and a phase which is set by the D.C. level setting circuit 160 to provide positive spike pulses 205 which appear at an output terminal E. The phase adjusted positive spike pulses 205 at terminal E are then applied to a frequency convertor 210 such as a resonant Inductor-Capacitor (L.C.) tank circuit 210 tuned to approximately 3.58 MHz. Circuit 210 converts the pulses to damped 3.58 MHz sinusoidal signals shown by wave form 215.

The signals 215 are applied to an amplifier and clipper stage 220. This signal is then applied to a second 3.58 MHz tank circuit 230. The tank circuit 230 develops sinusoidal 3.58 MHz signals 235 in response to the pulses 225. The signals 235 are applied to an amplifier and buffer stage 240. It is noted here that the 0.9 MHz signals 205 at output terminal E of circuit 200 can be shifted in phase at least 100° by virtue of the D.C. level setting circuit 160. When the 0.9 MHz signals are converted into 3.58 MHz signals by the two L.C. tank circuits 210 and 230, the 100° phase shift is multiplied by a factor of four corresponding to the ratio of the frequencies thereby increasing the available phase shift to 400° which is sufficient to set the phase of the output color subcarrier signals 245 from amplifier 240 to any desired point.

The color subcarrier signals 245 are applied to a keyer circuit 250 which also receives burst flag signals 15' from the burst flag amplifier 260 in response to the burst flag signals 15 received by amplifier 260 from generator 14. Amplifier 260 is coupled to keyer 250 by means of interconnected terminals W—W on the two drawing sheets comprising the figure. The output of the keyer 250 provides 8 to 11 cycles of color subcarrier signals timed by the burst flag signal 15 at input terminal D to be inserted in the back porch interval of each horizontal synchronization pulse interval in accordance with NTSC standards.

The 8 to 11 cycles of color subcarrier signals is represented by the wave form 255. These signals (255) are applied to a buffer amplifier 260 then to a relay 270 via interconnected terminals X—X. Relay 270 can be controlled at the front panel control of the electrical circuit 500 to add or remove the burst signals 255 as desired. In some instances, for example, the station may be generating independent burst signals and only want to insert the color adding signals. The use of relay 270 which operates as an open or close switch to couple signals from the buffer amplifier 260 to the buffer amplifier 280 accomplishes this operating flexibility.

When the relay 270 is on, the burst signals from buffer 260 are applied to buffer 280 and thence to a burst level circuit 290 which is a potentiometer used to adjust the amplitude of the burst signals. The amplitude adjusted burst signals from the circuit 290 are then applied to a video on/off relay 300 which operates as described below to couple the burst signals to the color signals and apply the resulting signals to a circuits in/-out relay 310 which, when in the "in" position, applies the color television signals to an output terminal F of the circuit 500.

The circuits described thus far receive 3.58 MHz color subcarrier signals from the television stations burst frequency generator 12 and frequency divide the signals to 0.9 MHz. The signals are then adjusted in phase as desired to provide 0.9 MHz signals having a preselected leading edge phase at output terminal E of circuit 200. The 0.9 MHz signals are then converted to 3.58 MHz color subcarrier signals and are keyed to provide burst signals which are combined with video signals in the chain. The 0.9 MHz signals of predetermined phase at terminal E are also employed to generate two independently adjustable color subcarrier signals employed to provide presetable chroma information which can be mixed with the black and white video signals in a predetermined manner by the remaining circuitry which is now described.

The differentiated 0.9 MHz signals 205 at terminal E of circuit 200 are applied to a buffer amplifier 320 which applies the output signals 322 to á sawtooth generator 325. Circuit 325′ is substantially the same as the sawtooth generator 150 described above. The resulting sawtooth signals 327 appear at an output terminal G of the sawtooth generator 325 and are applied to a pair of identical color subcarrier generating circuits 330*a* and 330*b*. Circuit 330*a* is shown in block diagram detail in the figure. Signals at terminal G are applied to a direct current voltage (D.C.) level setting circuit 335 of the upper color subcarrier generating circuit 330*a*. The level setting circuit 335 operates in an identical manner as the level setting circuit 160 described above. Thus, this circuit shifts the direct voltage (D.C.) level 336 of the resultant output sawtooth signals 334 from circuit 335 between a range within the B+ to B− supply voltages for the circuit. Output signals 334 have a 0.9 MHz frequency and a D.C. level 336 adjusted by front panel control for the circuit 335.

The D.C. level adjusted signals 334 are applied to a voltage responsive trigger circuit 340 such as a Schmitt Trigger which triggers at a predetermined voltage level during the rise time interval 337 of the sawtooth signals 334. The 0.9 MHz output pulses 345 from circuit 340 are leading edge time (phased) in accordance with the D.C. level 336 of signals 334 that is selected by the operator. Thus, the leading edge phase of the pulses 345 from the Schmitt Trigger 340 is preselectable. Signals 345 are then applied to an amplifier and clipper stage 350. The output pulses 355 from the amplifier and clipper stage 350 are applied to a differentiating and clipping circuit 360 which provides positive spike signals 365 which are 0.9 MHz in frequency and have a phase determined by the D.C. level 336 of the signals from the D.C. level-setting circuit 335. The differentiated pulses 365 are applied to a frequency conversion circuit such as a 3.58 MHZ L.C. tank circuit 370 which converts the 0.9 MHz signals to damped 3.58 MHz sinusoidal color subcarrier signals 375. Since the phase of the 0.9 MHz pulses from the Schmitt Trigger 340 can be varied over a range of at least 100°, the phase of the converter 3.58 MHz signals can be varied over a range of 400° as explained above.

The color subcarrier signals 375 are applied to an amplifier and clipper stage 380 and the resulting output signals 385 are applied to a variable gain amplifier 390. The amplification factor of amplifier 390 can be varied by means of a front panel control to provide saturation control for the resultant color subcarrier signals 395 therefrom. Thus, amplifier 390 provides saturation control of the generated color subcarrier signals while the D.C. level-setting circuit 335 provides hue control of the resultant color subcarrier signals.

The signals from amplifier 390 are applied to a second 3.58 MHz L.C. tank circuit 400 which serves to restore the sinusoidal shape of the color subcarrier signals in the event that amplifier 390 saturates and therefore clips the signals. The resulting sinusoidal signals 405 at the output of the tank circuit 400 are applied to an electrically operated switching circuit 420 such as a color keyer by a "color on/off" relay 410 which is controlled by a front panel control for the circuit 500. When the relay 410 is in the "on" position the color subcarrier signals 405 are applied to an input terminal H of the color keyer 420.

The lower color subcarrier generating circuit 330*b* is identical to the circuitry 330*a* between terminals G and H and serves to generate a second color subcarrier signal which has a phase and amplitude representative of a desired hue and saturation level of the color subcarrier signal generated thereby. The output from circuit 330*b* is coupled to an input terminal I of the switching circuit 420.

The switching or color keyer circuit 420 operates as a linear OR gate to couple one or the other of the color subcarrier signals at input terminals H or I to an output terminal J. Circuit 420 is controllable by an input signal applied to the control or keying terminal K to alternately switch one or the other of the input terminals H or I to output terminal J. An integrated circuit model number MC1545L or its equivalent commercially available from Motorola Semiconductor Products Inc. can be used for circuit 420. The control or keying signals applied to terminal K are shown by the wave form 425 adjacent terminal K. Signal 425 has two levels or states, a logic 1 and a logic 0 state indicated by the voltage levels 426 and 427 respectively. The keyer 420 responds to the control signals 425 to apply, for example, the color subcarrier signals at terminal H to terminal J when a logic 1 signal is received at input terminal K, and the signal at terminal I to terminal J when a logic 0 signal is received.

The two color subcarrier signals which are applied to output terminal J of the keyer circuit 420 from the individual color subcarrier signal generators 330*a* and 330*b* are shown adjacent terminal J. The first signal 421 may have a first amplitude 422 which corresponds to a predetermined saturation level of the chrominance information while the second signal 428 has a second amplitude 429 which is different than the amplitude 422 of signal 421 and which represents a different saturation level. Likewise, the phase of the signals 421 and 428 are substantially different as indicated by the wave forms. By varying the D.C. level 336 of the output wave forms 334 from circuit 335, as well as the gain of the amplifier 390, any desired hue and saturation levels for each of the signals 421 or 428 can be achieved. The signals may be identical or different in any desired degree. The keying signals 425 which actuate the keyer 420 are generated in the following manner.

Black and white video signals from camera 20 are applied to a video level detector (or video keying amplifier) 440 via a second portion 310′ of the circuits in 1 out relay 310. Thus, when the relay 310′ is in the closed position, the video signals from terminal A of the camera 20 are applied to circuit 440. These signals are composite or no-composite television video signals. Circuit 440 is a video level detecting circuit which provides the logic 1 or 0 output signals 425 in response to luminance signals having an amplitude greater or less than a predetermined reference level. The reference level is set by a direct voltage (D.C.) level circuit 445 which applies an adjustable reference D.C. potential to the circuit 440. Circuit 445 has a D.C. level adjustment control on the front panel of the circuit 500 for easy access.

The operation of the circuit 440 to supply keying pulses 425 for the keyer 420 can best be explained by referring to the wave form 25 below the input terminal 442 of the keying amplifier which illustrates a portion of the video signals from camera 20 and the black and white luminance levels of the video signals. The upper horizontal line corresponds to the white video signal level whereas the lower horizontal line corresponds to the black video signal level. The intermediate line labeled V ref corresponds to the reference D.C. level applied to the video level detector 440 from the D.C. level setting circuit 445. Portions of the object 30 which are scanned by the camera 20 to provide luminance signals that are toward the white level in relation to the V ref level (such as the background 31) are detected by the video level detector 440 which responds thereto by providing a logic 1 output signal (level 426 of wave form 425). Portions of the object 30 such as the lettering 32 will have a luminance level which is between the V ref level and the black level. The video level detector 440 will detect this video level to provide a logic 0 output signal (level 427 of waveform 425).

The output signals 425 from circuit 440 are applied to the keying terminal I of the keyer 420 via a key on/-off relay 450 and interconnected terminals Z—Z. It is noted that relay 450 is controllable from the front panel of the circuit 500 such that if desired, the color keyer will be held in one condition thereby providing a continuous full screen color effect at the television receiver since continuous color subcarrier signals 421 or 428 will be present at output terminal F of circuit 500. When relay 450 is in the "on" position, the keying pulses 425 from the video level detecting circuit 440 provide alternate colors corresponding to luminance levels above and below the adjustable V ref point. It is noted that the relay 310 and 310′ when in the "out" position couple the black and white composite television signals from the output terminal A of camera 20 directly to output terminal F of the circuit 500, thereby by-passing the color adding circuitry within circuit 500. When in the "in" position, however, the black and white composite television signals are applied to the circuit 440 and to a conventional video amplifier 460 which amplifies the black and white composite television signals and applies them to a mixer circuit 470.

The mixer circuit 470 also receives the color signals 421 and 428 from the color keyer 420 via interconnected terminals *y—y*, buffer amplifier 480 and a blanking keyer 490. The blanking keyer 490 receives blanking signals from amplifier 495 in response to input blanking pulses 496 from the synchronization signal generator 10. Blanking keyer 490 serves to prevent color signals from being applied to the mixer 470 from buffer 480 in the event that no video signals are detected, without it, one of the color signals would be continuously transmitted when it is desired to have no luminance or color signals at the receiver, as during vertical and horizontal blanking intervals.

To operate the circuitry 500, the circuits in/out relay 310 and 310′ is switched to the "in" position which couples the black and white video signals into the system. Also, the key on/off relay 450 and video on/off relay 300 as well as burst relay 270 are switched to the "on" position. As the raster of the camera detects the luminance levels of the object 30 and particularly the light background 31 and darker letter portions 32, the video level detecting circuit 440 provides keying pulses 425 to the color keyer circuit 420. At the same time, the two color subcarrier generating circuits 330*a* and 330*b* are receiving 0.9 MHz signals from the output terminal E of the circuit 200 and supplying two color signals which can be adjusted as desired by the operator for a predetermined hue and saturation level. The operator also can adjust the D.C. level generating circuit 445 to provide the desired trigger point for the video level detector 440 such that the desired transition between the two colors is achieved. If it were desired to transmit a full colored frame, the key on/off relay 450 could be switched "off" such that the color keyer 420 would continuously couple one of the input terminals H or I to the output terminal J.

In the broader aspects of this invention, the circuits 100 through 240 in circuit 500 can be employed to generate color subcarrier signals of any desired phase by converting color subcarrier signals from a source into integral submultiple signals, phase shifting the resulting integral submultiple signals and frequency converting the resultant phase shifted signals into color subcarrier signals having a frequency of 3.58 MHz and having a desired presetable phase. With the circuit shown in the figure, the operator can adjust the burst signals 255 to any desired phase by adjusting the D.C. level 166 of the signals 165 from circuit 160 by means of the level setting control of the circuit 160. Thus, the color phase of the burst signals can be locked with those of any source at the station.

Although the circuit of the preferred embodiment described provides two color subcarrier signals which corresponded to video level signals above and below a reference level, it is understood that by using a plurality of video level detecting circuits, each with a different reference voltage together with a greater number of color generating circuits such as circuits 330*a* and 330*b;* the luminance level signals between the white and black levels can be divided into any number of predetermined segments, each of which have a preassigned color signal which can be added to the black and white video signals to provide composite multicolored television signals. Various other modifications to the circuitry of the present invention will be apparent to those skilled in the art and will fall within the scope of the present invention as defined by the appended claims.

The embodiments of the invention in which an exclusive property or privilege is claimed are defined as follows.

1. An electrical circuit for generating a color subcarrier television signal having a predetermined phase comprising: means for receiving color subcarrier signals, frequency dividing means coupled to said receiving means for providing signals which are a submultiple frequency of received color subcarrier signals, means coupled to said frequency dividing means for shifting the phase of said submultiple frequency signals, and means coupled to said phase shifting means for converting said submultiple signals to signals having a frequency of approximately 3.58 MHz and having a predetermined presetable phase.

2. The electrical circuit as defined in claim 1 wherein said frequency dividing means comprises: a divide-by-four binary circuit.

3. The electrical circuit as defined in claim 1 wherein said phase shifting means comprises: a sawtooth signal generator, an adjustable direct voltage level setting circuit couple to said sawtooth generator for providing sawtooth signals therefrom having a direct voltage level which is presetable, and a voltage responsive trigger circuit coupled to said direct voltage level setting circuit and responsive to said sawtooth signals to provide output signals therefrom having a phase which is related to the direct voltage level set by said direct voltage level setting circuit.

4. The electrical circuit as defined in claim 3 wherein said voltage responsive trigger circuit is a Schmitt Trigger.

5. The electrical circuit as defined in claim 4 wherein said frequency converting means includes a resonant circuit tuned to approximately 3.58 MHz.

6. An electrical circuit for converting black and white composite or non-composite television signals into two color composite or non-composite color television signals comprising: means for receiving black and white television signals, means coupled to said receiving means for detecting the luminance level of received black and white television signals and for providing control signals representative thereof, means for generating first and second color subcarrier signals each having a presetable phase and amplitude, a mixer circuit for receiving black and white television signals and color subcarrier signals and for providing color television output signals therefrom, and switching means coupled between said generating means and said mixer circuit and having an input terminal coupled to said detecting means to receive said control signals therefrom, said switching means responsive to said control signals to couple one of said first or second color subcarrier signals from said generating means to said mixer circuit in response to detected luminance signals of a predetermined level.

7. The electrical circuit as defined in claim 6 wherein said color subcarrier signal generating means includes means for coupling a source of subcarrier signals to said generating means, a frequency divider coupled to said coupling means for providing submultiple frequency signals from color subcarrier signals, phase shifting means for shifting the phase of said multiple frequency signals, and converting means for converting the phase shifted submultiple frequency signals to color subcarrier signals having a predetermined phase.

8. The circuit as defined in claim 7 and further including a variable gain amplifier coupled to said converting means for providing color signals having a presetable amplitude.

9. The electrical circuit as defined in claim 8 wherein said phase shifting means comprises: a sawtooth signal generator, an adjustable direct voltage level setting circuit coupled to said sawtooth generator for providing sawtooth signals therefrom having a direct voltage level which is presetable, and a voltage responsive trigger circuit coupled to said direct voltage level setting circuit and responsive to said sawtooth signals to provide output signals therefrom having a phase which is related to the direct voltage level set by said direct voltage setting circuit.

10. The electrical circuit as defined in claim 9 wherein said frequency divider comprises a divide-by-four binary circuit.

11. The electrical circuit as defined in claim 10 wherein said voltage responsive trigger circuit is a Schmitt Trigger.

12. The electrical circuit as defined in claim 11 wherein said converting means comprises a resonant circuit tuned to approximately 3.58 MHz.

13. An electrical circuit for generating a color subcarrier television signal having a predetermined phase and amplitude and mixing said color subcarrier signal with luminance signals from a source of black and white television signals comprising: means for receiving color subcarrier signals, frequency dividing means coupled to said receiving means for providing signals which are a submultiple frequency of received subcarrier signals, means for shifting the phase of the submultiple frequency signal a presetable amount, means coupled to said phase shifting means for converting said submultiple frequency signals to a frequency of approximately 3.58 MHz and having a phase related to said presetable amount, and means for moving the resulting 3.58 MHz signals with luminance signals of a predetermined level to provide chrominance information to black and white television signals thereby providing color television signals.

14. The circuit as defined in claim 13 and further including additional phase shifting means coupled to said frequency dividing means, an additional converting means coupled to said additional phase shifting means for providing additional signals of approximately 3.58 MHz, level detecting means coupled to a source of black and white television signals for detecting the luminance level of black and white television signals and for providing control signals representative thereof, and controlled switching means coupled from said converting means and from said additional converting means to said mixing means, said switching means including an input terminal coupled to said level detecting means for receiving said control signals therefrom, said switching means responsive to said control signals to couple one of said 3.58 MHz or said additional 3.58 MHz signals to said mixing means in response to detected luminance signals of a predetermined level.

15. An electrical circuit for providing color subcarrier signals which can be phase matched to any source of color subcarrier signals and for adding color information to luminance signals received from a source of black and white television signals to provide color television signals, said circuit comprising: means for receiving color subcarrier signals from a source of such signals, first frequency dividing means coupled to said receiving means for providing submultiple frequency signals in response to received color subcarrier signals, first phase shifting means for shifting the leading edge phase of said submultiple color subcarrier signals over a desired range, first frequency conversion means for converting said phase shifted submultiple color subcarrier signals to the original frequency of said received color subcarrier signals but at a phase determined by said first phase shifting circuit, a second phase shifting circuit coupled to the output of said first phase shifting circuit, second frequency conversion means coupled to said second phase shifting circuit for converting phase shifted signals therefrom to signals having a frequency equal to the frequency of said received color subcarrier signals and phased in accordance with said second phase shifting means, and means coupled to a source of black and white television signals and to said second conversion means for selectively combining output signals from said second frequency conversion means with black and white television signals from said source thereof thereby converting said black and white television signals into color television signals in which predetermined luminance signal levels include color hue information corresponding to the phase of the signals from said second phase shifting circuit.

16. The electrical circuit as defined in claim 15 wherein said selective combining means comprises a video level detecting circuit coupled to said source of black and white television signals, a mixer circuit coupled to said source of black and white television signals, and a switching circuit coupled between said second frequency conversion means and said mixing circuit and having an input terminal coupled to the output of said level detecting circuit for receiving control signals therefrom to selectively couple said signals from said second frequency conversion means to said mixer circuit in response to detected video signals having a predetermined level.

17. The electrical circuit as defined in claim 16 and further including a third phase shifting circuit coupled to the output of said first phase shifting circuit, third frequency conversion means coupled to said third phase shifting circuit for converting phase shifted signals therefrom to signals having a frequency equal to the frequency of said received color subcarrier signals and phased in accordance with said third phase-shifting means, said third frequency conversion means coupled to said switching circuit such that signals therefrom are selectively combined with said black and white television signals together with signals from said second frequency conversion means to provide two color, color television signals.

* * * * *